United States Patent
Unno et al.

(10) Patent No.: US 8,015,326 B2
(45) Date of Patent: Sep. 6, 2011

(54) CENTRAL PROCESSING APPARATUS, CONTROL METHOD THEREFOR AND INFORMATION PROCESSING SYSTEM

(75) Inventors: Hideyuki Unno, Kawasaki (JP); Masaki Ukai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/199,004

(22) Filed: Aug. 27, 2008

(65) Prior Publication Data
US 2008/0320201 A1    Dec. 25, 2008

Related U.S. Application Data

(63) Continuation of application No. PCT/JP2006/303649, filed on Feb. 27, 2006.

(51) Int. Cl.
*G06F 3/00* (2006.01)
(52) U.S. Cl. ............. 710/38; 710/31; 710/36; 710/100; 710/306; 710/308
(58) Field of Classification Search .......... 710/306, 710/308, 31, 36, 38, 100
See application file for complete search history.

(56) References Cited

U.S. PATENT DOCUMENTS

| | | | | |
|---|---|---|---|---|
| 3,307,984 A | * | 3/1967 | Frazier | 438/543 |
| 4,207,609 A | * | 6/1980 | Luiz et al. | 710/38 |
| 4,435,755 A | * | 3/1984 | Meritt | 710/38 |
| 4,697,232 A | * | 9/1987 | Brunelle et al. | 710/46 |
| 5,511,169 A | * | 4/1996 | Suda | 710/100 |
| 5,542,055 A | * | 7/1996 | Amini et al. | 710/306 |
| 5,590,252 A | * | 12/1996 | Silverbrook | 715/203 |
| 5,797,036 A | * | 8/1998 | Kikinis | 710/38 |
| 5,958,024 A | * | 9/1999 | Typaldos et al. | 710/26 |
| 6,145,028 A | * | 11/2000 | Shank et al. | 710/31 |
| 6,185,654 B1 | * | 2/2001 | Van Doren | 711/5 |
| 6,356,991 B1 | * | 3/2002 | Bauman et al. | 711/209 |
| 6,789,141 B2 | * | 9/2004 | Ayukawa et al. | 710/38 |

(Continued)

FOREIGN PATENT DOCUMENTS

EP    0 164 138 A1    12/1985
(Continued)

OTHER PUBLICATIONS

Wang et al. Application-layer multipath data transfer via TCP: Scehemes and performance tradeoffs. Performance Evaluation 64. Jun. 26, 2007.*
Garraway et al. VMware Multipathing with the SAN Volume Controller and the Causes of SCSI-2 Reservation Conflicts. Redpaper. IBM Corp. 2009.*

(Continued)

*Primary Examiner* — Matthew D Spittle
(74) *Attorney, Agent, or Firm* — Staas & Halsey LLP

(57) ABSTRACT

A plurality of system controllers 300 each comprising a memory medium 400 and an I/O device 500 under the control of the system controller 300 are connected to a CPU node 100 by way of a plurality of system buses 200. The CPU node 100 executes a memory interleave for distributing memory accesses to the system buses 200 (i.e., the system controllers 300). In performing an I/O access to the I/O device 500, the CPU node 100 firstly inquires from a representative system controller 300 (SC0) as to which system bus 200 (i.e., a system controller 300) has a target I/O device 500 and then executes an actual I/O access to the system bus 200 returned in a response from the SC0. Even when the CPU node 100 executes a memory interleave in the case of a memory-mapped I/O, the CPU node 100 is not required to manage the location information of the I/O device 500.

9 Claims, 10 Drawing Sheets

U.S. PATENT DOCUMENTS

| | | | |
|---|---|---|---|
| 6,850,997 B1 * | 2/2005 | Rooney et al. | 710/38 |
| 6,957,219 B1 * | 10/2005 | Lin et al. | 1/1 |
| 6,981,075 B2 * | 12/2005 | Ayukawa et al. | 710/38 |
| 7,191,278 B2 * | 3/2007 | Serizawa et al. | 711/100 |
| 7,451,252 B2 * | 11/2008 | Rooney et al. | 710/38 |
| 7,467,241 B2 * | 12/2008 | Masuyama | 710/38 |
| 2003/0172331 A1 * | 9/2003 | Cherian et al. | 714/712 |
| 2005/0138276 A1 | 6/2005 | Navada et al. | |

FOREIGN PATENT DOCUMENTS

| | | |
|---|---|---|
| JP | 5-20182 | 1/1993 |
| JP | 7-64848 | 3/1995 |
| JP | 10-254820 | 9/1998 |

OTHER PUBLICATIONS

Ribeiro et al. Minimum Delay Path Selection in Multi-Homed Systems with Path Asymmetry. IEEE Communications Letters. vol. 10. No. 3. Mar. 2006.*

Hideo Harada et al., "New-generation Large-Scale general purpose computers bearing the early nineties", Nikkei Computer, 33 pages.

International Search Report for PCT/JP2006/303649, mailed Nov. 14, 2006.

European Search Report issued Jul. 26, 2010 in corresponding European Patent Application 06714786.8.

Japanese Office Action issued Mar. 29, 2011 in corresponding Japanese Patent Application 2008-501586.

* cited by examiner

| VALUE OF PA[9:8] | WHEN USING FOUR SCs | WHEN USING TWO SCs |
|---|---|---|
| 00 | BUS0 | BUS0 |
| 01 | BUS2 | BUS0 |
| 10 | BUS1 | BUS1 |
| 11 | BUS3 | BUS1 |

| (1) FIRST SC REQUEST | | | (2) FIRST RESPONSE SC ORDER | | | (3) SECOND SC REQUEST | | | (4) SECOND RESPONSE SC ORDER | | |
|---|---|---|---|---|---|---|---|---|---|---|---|
| TRANSACTION NAME | ISSUANCE ORIGIN | ISSUED DESTINATION | TRANSACTION NAME | ISSUANCE ORIGIN | ISSUED DESTINATION | TRANSACTION NAME | ISSUANCE ORIGIN | ISSUED DESTINATION | TRANSACTION NAME | ISSUANCE ORIGIN | ISSUED DESTINATION |
| NC-RD | CPU | SC0 | SN-RES-NC | SC0 | CPU | SR-NC | CPU | BUS[1:0] DESIGNATED | DOW-SR-NC-RTN | SAME AS SR-NC | CPU |
|  |  |  | SN-RES-AX | SC0 | CPU | — | — | — | — | — | — |
| NC-BR | CPU | SC0 | SN-RES-NC | SC0 | CPU | SR-NB | CPU | BUS[1:0] DESIGNATED | DOW-SR-NB-RTN | SAME AS SR-NB | CPU |
|  |  |  | SN-RES-AX | SC0 | CPU | — | — | — | — | — | — |
| NC-WR | CPU | SC0 | SN-RES-NC | SC0 | CPU | SW-NC | CPU | BUS[1:0] DESIGNATED | DOW-CMD-CPLT | SAME AS SW-NC | CPU |
|  |  |  | SN-RES-AX | SC0 | CPU | — | — | — | — | — | — |
| NC-BW | CPU | SC0 | SN-RES-NC | SC0 | CPU | SW-NB | CPU | BUS[1:0] DESIGNATED | DOW-CMD-CPLT | SAME AS SW-NB | CPU |
|  |  |  | SN-RES-AX | SC0 | CPU | — | — | — | — | — | — |

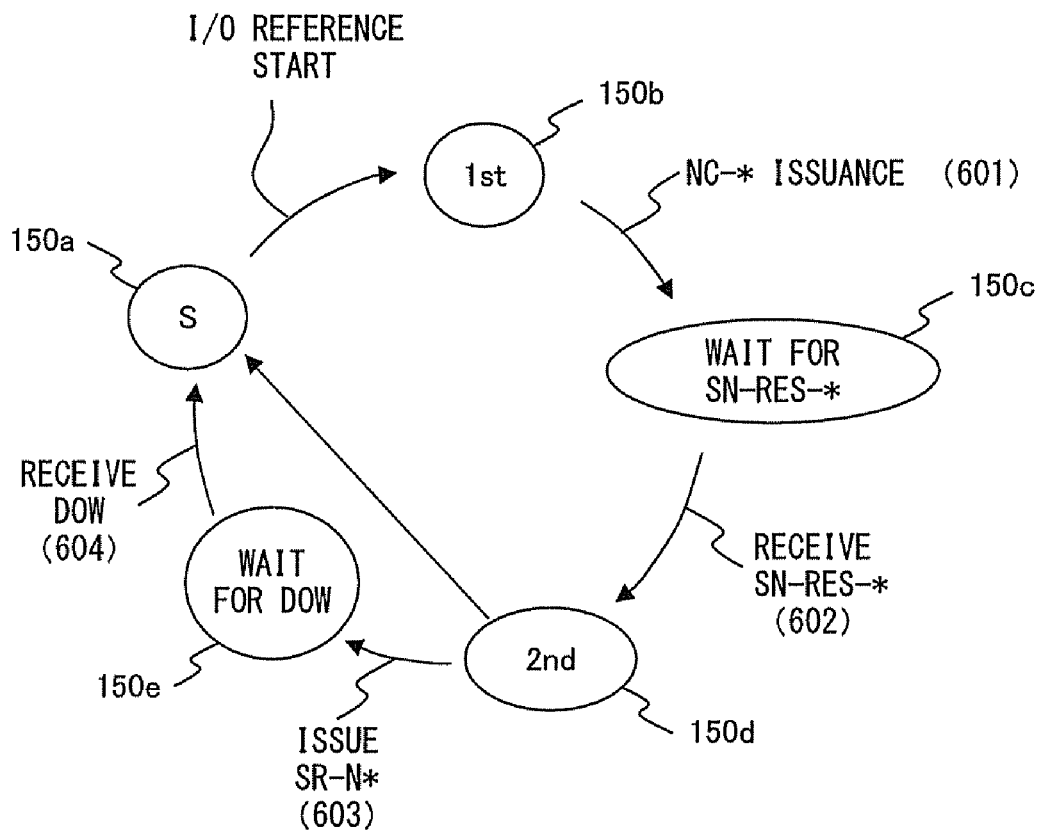
F I G. 8

CENTRAL PROCESSING APPARATUS, CONTROL METHOD THEREFOR AND INFORMATION PROCESSING SYSTEM

CROSS REFERENCE TO RELATED APPLICATIONS

This application is a continuation application of international PCT application No. PCT/JP2006/303649 filed on Feb. 27, 2006.

BACKGROUND OF THE INVENTION

1. Field of the Invention

The present invention relates to a central processing apparatus, a control method therefore, and an information processing system.

2. Description of the Related Art

A calculation capability of each central processing apparatus (i.e., central processing unit (CPU) chip) in, for example, an information processing system has been on the increase over the years in concert with the development of semiconductor production process technologies and other such developments.

In order to utilize the high calculation capabilities of central processing apparatuses effectively, the memory bandwidth (i.e., memory access speed) per central processing apparatus in memory access needs to be increased.

Conventionally, a single system controller is connected to a central processing apparatus so that the system controller carries out an interleaving to distribute access requests to a plurality of memory media. Therefore, the conventional technique cannot enable the central processing apparatus to recognize that the interleaving is taking place.

This accordingly necessitates thickening the bus (i.e., increasing the number of signal lines) between the central processing apparatus and system controller, and, associated with this, a thickened bus needs to be provided between the system controller and memory media in order to secure a sufficient memory bandwidth per central processing apparatus.

As a result, the number of signal lines connected to the system controller grows large. This is significant obstacle to obtain a higher system performance at a lower cost.

SUMMARY OF THE INVENTION

Accordingly, the present invention discloses that a plurality of buses (i.e., WAYS) are furnished between a central processing apparatus and a plurality of system controllers so as to make the central processing apparatus carry out an interleaving, and thereby the number of signal lines connected to the individual system controllers is reduced.

Some technical problems are caused by connecting a plurality of buses to a central processing apparatus and making the central processing apparatus carry out a direct interleaving.

That is, the central processing apparatus is required to issue an input/output (I/O) request packet to an appropriate bus on which an I/O device exists, in accordance with the present I/O device to be desirably accessed.

A main storage is interleaved by using an address and therefore it is possible to implement a conversion process for obtaining the number of the system controller (i.e., the bus) to which the memory as the target of access ("access target" memory) is connected relatively easily from the address.

The correspondence between the address and access target I/O device in a memory-mapped I/O, however, needs to have a higher degree of freedom in many cases.

It is therefore conceivable to equip all the central processing apparatuses with setup registers and to set configuration information to define which I/O device exists in which bus (i.e., WAY); it is not practical for a system in which a plurality of central processing apparatuses exist.

The reason this is not practical is that each of the plurality of central processing apparatuses must have setup information of the same content, bringing about the problem of substantially wasting the storage resource within the central processing apparatus and of ushering in an increased cost thereof.

Furthermore, there is also a technical problem of increasing management costs for securing the sameness (i.e., the consistency) of configuration information among a plurality of CPUs (i.e., central processing apparatuses).

Therefore, the present invention is contrived to overcome these technical problems in the following manner.

A purpose of the present invention is to enable an effective utilization of the processing capability of a central processing apparatus without complicating the configuration of a system controller connected to the central processing apparatus.

Another purpose of the present invention aims at achieving an improvement in processing capability by a central processing apparatus performing a low-cost interleaving without complicating the configuration within the central processing apparatus and/or the management thereof.

A first aspect of the present invention is to provide a central processing apparatus comprising a bus control unit for performing input/output of information between a plurality of buses; a memory access control unit for distributing memory access requests to a plurality of the buses in accordance with memory addresses; and an input/output access control unit for accessing an external input/output device by way of the bus.

A second aspect of the present invention is to provide the central processing apparatus according to the first aspect, wherein the input/output access control unit carries out a first step of inquiring, by way of a specific one of the buses, as to which of the buses the input/output device of an access target exists on, and a second step of accessing the input/output device by using the bus which is response from the system controller.

A third aspect of the present invention is to provide the central processing apparatus according to the first aspect, wherein the memory access control unit performs a memory interleave for parallelly accessing, in accordance with the physical memory addresses, a plurality of memory media individually connected to a plurality of the buses.

A fourth aspect of the present invention is to provide a control method used for a central processing apparatus, comprising the steps of: connecting the central processing apparatus to a plurality of buses; and the central processing apparatus carrying out a memory interleave for distributing a plurality of memory access requests to memory media existing on the buses in accordance with memory addresses.

A fifth aspect of the present invention is to provide the control method used for a central processing apparatus according to the fourth aspect, further comprising the steps of: the central processing apparatus inquiring, by way of a specific one of the buses, as to which of the buses the input/output device of an access target exists on; and the central processing apparatus accessing the input/output device by using the bus which is responded from a system controller.

A sixth aspect of the present invention is to provide an information processing system, comprising: a central processing apparatus; a plurality of system controllers, each of which at least comprises either a memory medium or an input/output device under the control of the system controller; a plurality of buses connecting the central processing apparatus and individual system controllers, respectively; and a memory access control unit that is equipped in the central processing apparatus and which distributes a plurality of memory access requests to memory media existing on the bus in accordance with memory addresses.

A seventh aspect of the present invention is to provide the information processing system according to the sixth aspect, wherein the central processing apparatus further comprises an input/output access control unit for carrying out a first step of inquiring, by way of a specific one of the buses, as to which of the buses the input/output device of an access target exists on, and a second step of accessing the input/output device by using the bus that was returned in the response from the system controller.

An eighth aspect of the present invention is to provide the information processing system according to the sixth aspect, wherein each of a plurality of central processing apparatuses is respectively connected to individual system controllers of a plurality of system controllers by way of the plurality of buses.

A ninth aspect of the present invention is to provide the information processing system according to the sixth aspect, wherein each of the system controllers is constituted by a plurality of semiconductor chips.

The present invention is contrived to connect a plurality of buses to the central processing apparatus so that the central processing apparatus executes a memory interleave and therefore a thick bus having an unnecessarily large number of signal lines is not required between the central processing apparatus and system controller.

This contrivance makes it possible to attain a high memory bandwidth while reducing the production cost of semiconductor chips and the like constituting the system controller, and to cause the central processing apparatus to exert the processing capability sufficiently.

Further, the present invention is contrived to confirm which bus a target input/output device exists on by way of a specific bus and then carry out an input/output access to the input/output bus that was returned in the response when accessing an input/output device, thereby eliminating the need to equip each of a plurality of central processing apparatuses with a special storage resource for setting common configuration information and, furthermore, the need to carry out a cumbersome operation for managing the consistency of the aforementioned configuration information.

This in turn makes it possible to achieve an improvement in processing performance by the central processing apparatus executing a memory interleave at low cost without complicating the configuration within the central processing apparatus and the management thereof.

In other words, it is possible to attain both a high performance by means of an interleave at the level of central processing apparatus and a flexible configuration change in an information processing system comprising the present central processing apparatus, system controller, and input/output device.

BRIEF DESCRIPTION OF DRAWINGS

FIG. 5 is a conceptual diagram exemplifying a memory-interleave method for use in a central processing apparatus according to a preferred embodiment of the present invention;

FIG. 7 is a conceptual diagram exemplifying an I/O access transaction between a system controller and a central processing apparatus according to a preferred embodiment of the present invention;

FIG. 8 is a state transition diagram exemplifying the operation of an I/O access in a central processing apparatus according to a preferred embodiment of the present invention;

DESCRIPTION OF THE PREFERRED EMBODIMENTS

The following is a description, in detail, of the preferred embodiment of the present invention by referring to the accompanying drawings.

Figure 1:
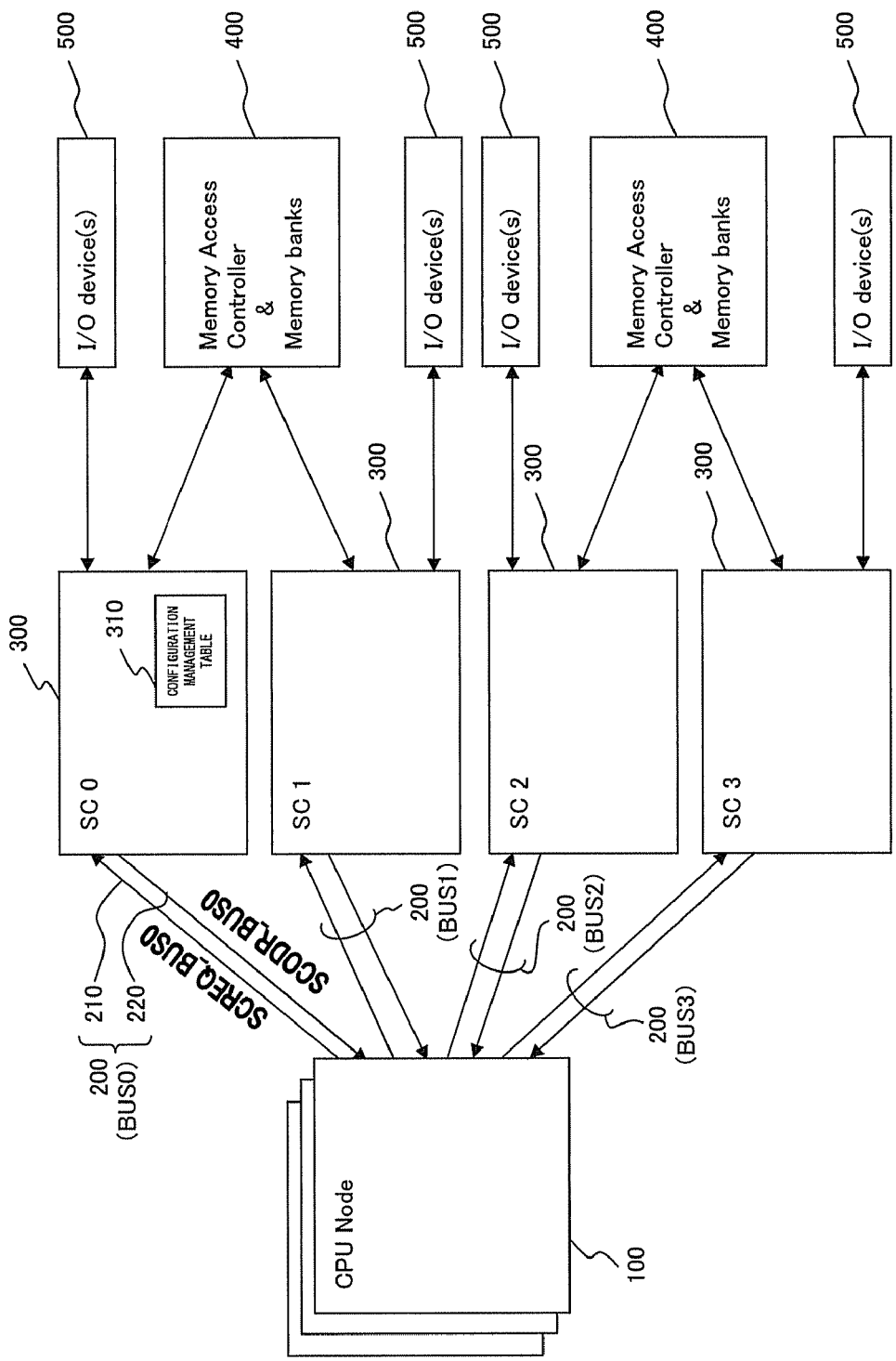
FIG. 1 is a conceptual diagram exemplifying the configuration of an information processing system comprising a central processing apparatus according to a preferred embodiment of the present invention.
Figure 2:
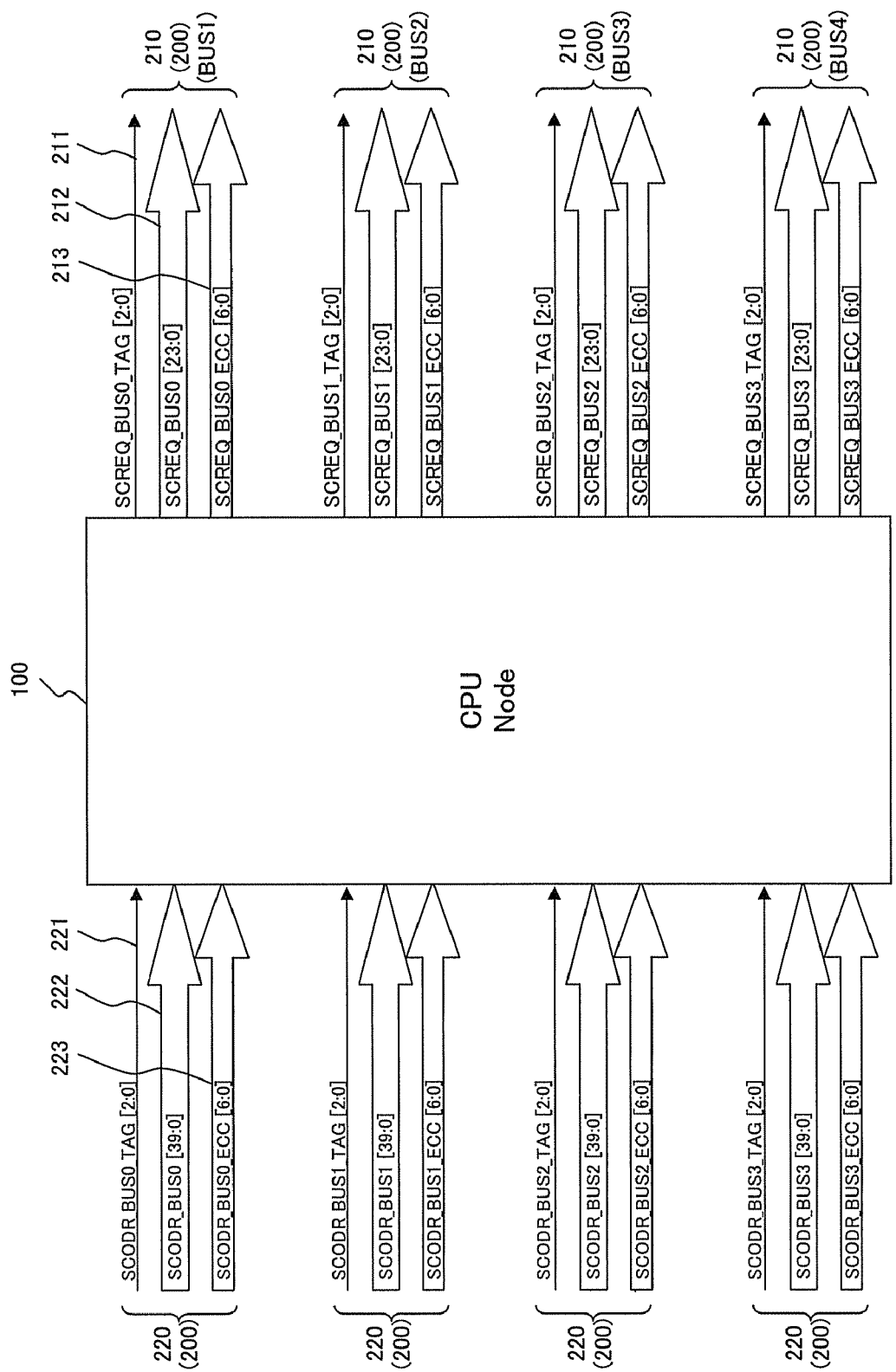
FIG. 2 is a conceptual diagram exemplifying the connection state of a bus to a central processing apparatus according to a preferred embodiment of the present invention.

FIG. 1 is a conceptual diagram exemplifying the configuration of an information processing system comprising a central processing apparatus according to a preferred embodiment of the present invention. FIG. 2 is a conceptual diagram exemplifying the connection state of a bus to a central processing apparatus according to the present embodiment.

The information processing system according to the present embodiment comprises a plurality of CPU nodes 100, a plurality of system controllers 300, a plurality of memory media 400, and a plurality of I/O devices 500, as exemplified in FIG. 1.

The memory media 400 and I/O devices 500 are connected to, and under the control of, each system controller 300. Each system controller 300 controls the exchanges between each CPU node 100 and the memory medium 400 and I/O device 500, the latter two of which are under the control of the system controller 300.

The I/O device 500 is mapped in a memory address space so that an access from the CPU node 100 to the I/O device 500 is carried out by way of a memory-mapped I/O.

The SC0 representing a plurality of system controllers 300 (i.e., SC0 through SC3) comprises a configuration management table 310 for setting information describing which of the system controllers 300 (i.e., system buses 200) a plurality of I/O devices 500 exist under the control of. The SC0 refers to the configuration management table 310, and makes a response in response to a later described inquiry from the CPU node 100.

The memory medium 400 comprises, for example, storage media (i.e., memory banks) such as semiconductor memory and a memory controller controlling them.

The memory media 400 existing under the control of individual system controllers 300 are physically independent from each other and are enabled for parallel access operations.

The present embodiment is configured to connect the individual system controllers 300 (i.e., SC0 through SC3) to each of a plurality of CPU nodes 100 by way of system buses 200.

The individual CPU node 100 comprises the function of executing a memory interleave for distributing memory access requests to a plurality of system buses 200 (i.e., system controllers 300) and thereby carrying out parallel memory accesses among the plurality of memory media 400 under the control of individual system controllers 300, as described later.

That is, the present embodiment is configured to control a memory interleave for accesses to the memory media 400 at the level of the CPU nodes 100.

As exemplified in FIG. 2, system buses 200 equipped between an individual CPU node 100 and each of the plurality of system controllers 300 comprises an SC request bus 210 (SCREQ_BUSn) and an SC order bus 220 (SCODR_BUSn).

The SC request bus 210 transfers information from the CPU node 100 to the system controller 300. The SC request bus 210 is constituted by TAG bit 211 (SCREQ_BUSn_TAG), data bit 212 (SCREQ_BUSn), and ECC bit 213 (SCREQ_BUSn_ECC).

The SC order bus 220 is used for transferring information from the system controller 300 to the CPU node 100. The SC order bus 220 is constituted by TAG bit 221 (SCODR_BUSn_TAG), data bit 222 (SCODR_BUSn), and ECC bit 223 (SCODR_BUSn_ECC).

"n" represents SC0 through SC3 (i.e., the system controllers 300) at the connection destination.

For example, SCREQ_BUSn_TAG is 3 bits, SCREQ_BUSn is 24 bits, and SCREQ_BUSn_ECC is 7 bits in the case of the present embodiment.

Further, SCODR_BUSn_TAG is 3 bits, SCODR_BUSn is 40 bits, and SCODR_BUSn_ECC is 7 bits.

Figure 3:
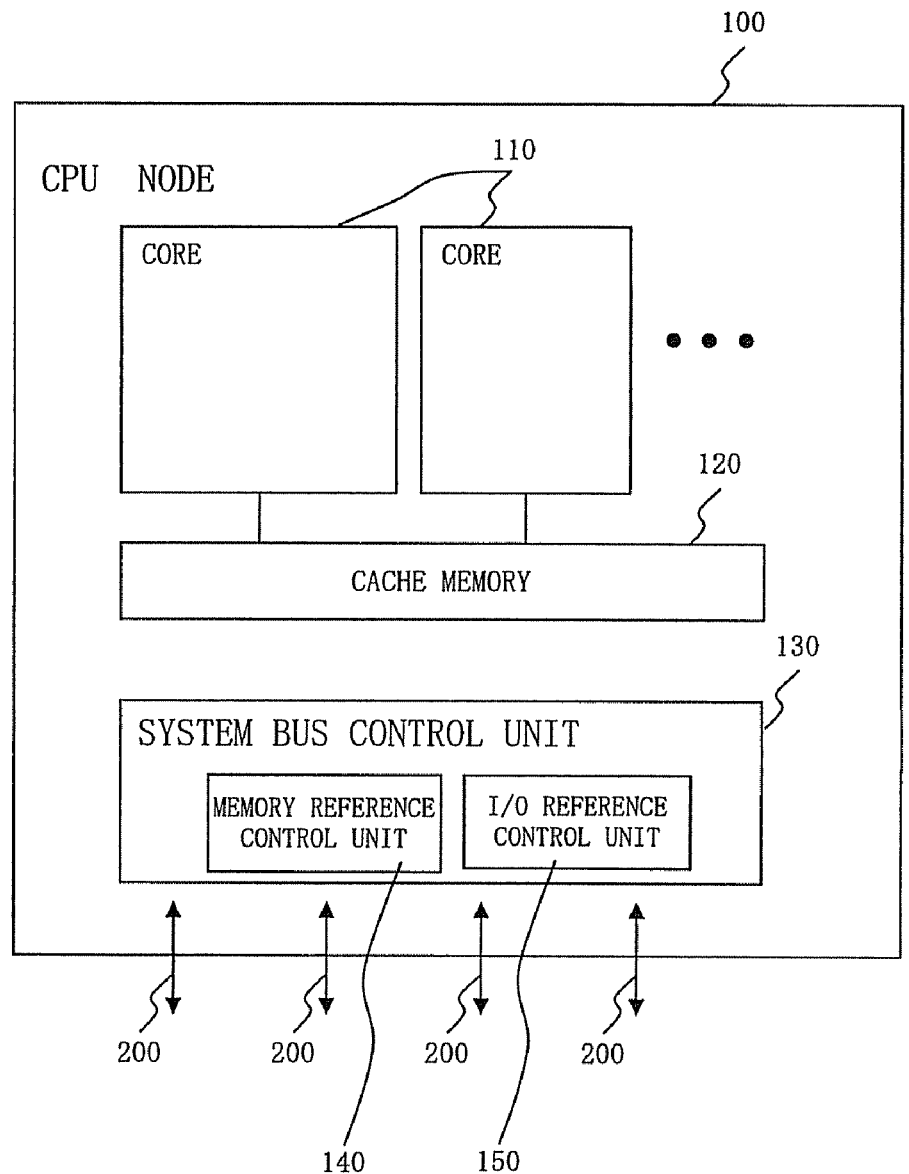
FIG. 3 is a block diagram exemplifying the internal configuration of a central processing apparatus according to a preferred embodiment of the present invention.

FIG. 3 is a block diagram exemplifying the internal configuration of a CPU node 100 according to the present embodiment.

The CPU node 100 according to the present embodiment comprises one processor core 110 or a plurality thereof, cache memory 120, and a system bus unit 130.

The processor core 110 comprises an arithmetic logical operation function, such as an arithmetic logical operation unit (ALU), and a control function.

The cache memory 120 temporarily stores information exchanged between the processor core 110 and the outside.

The system bus control unit 130 controls the exchange of information between a plurality of system buses 200 connected to the CPU node 100.

The present embodiment is configured such that the system bus control unit 130 is equipped with a memory reference control unit 140 and an I/O reference control unit 150.

The memory reference control unit 140 controls the memory interleave for a plurality of memory media 400 existing under the control of the individual system controllers of a plurality of system controllers 300 (i.e., system buses 200).

That is, the present embodiment is configured to control interleaving the memory at the level of the CPU node 100.

Figure 4:
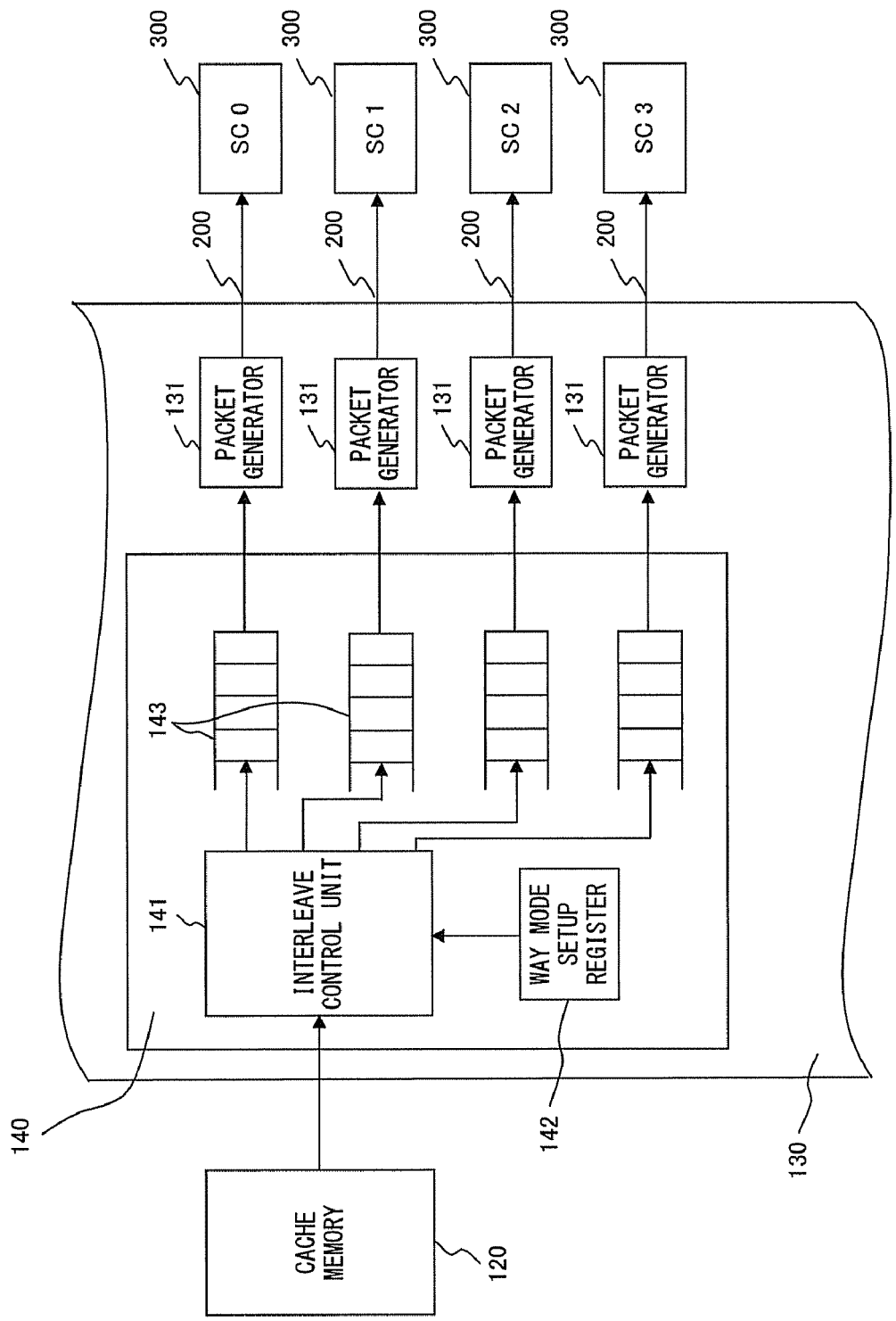
FIG. 4 is a block diagram exemplifying the internal configuration of a central processing apparatus according to a preferred embodiment of the present invention.

As exemplified in FIG. 4, the memory reference control unit 140 according to the present embodiment comprises an interleave control unit 141, a WAY mode setup register 142, and a memory access queue 143.

The memory access queues 143 are equipped corresponding to respective packet generators 131, to which the system buses 200 (i.e., system controllers 300) are respectively connected.

Further, the interleave control unit 141 carries out a memory interleave by distributing access requests to the memory access queues 143 corresponding to the respective system buses 200 by way of the physical addresses (PA) (i.e., the lower 2 bits of SCREQ_BUSn in this case; in terms of the entirety of the system bus 200, 2 bits of PA [9:8] of the eighth and ninth from the lower bit) of reference target memory.

The relationship between the physical address of a memory medium 400 and the corresponding system controller 300 is defined in the WAY mode setup register 142.

That is, what is defined in the WAY mode setup register 142 is how to distribute to any of the SCREQ_BUSn, in accordance with the 2 bits of the physical address PA [9:8], for each of the cases in which there are four system controllers 300 (SC) (per the configuration of FIG. 1) and in which there are two system controllers 300 (SC) (per the configuration of FIG. 1 minus the two options SC2 and SC3), as exemplified in FIG. 5.

The interleave control unit 141 refers to the WAY mode setup register 142 and distributes the memory access requests to the respective system controller 300 (i.e., SC0 through SC3, or SC0 and SC1).

Incidentally, when carrying out a memory interleave at the CPU node 100 level as in the configuration of the present embodiment, if the I/O device 500 is mapped in the memory address space, the CPU node 100 is incapable of having pre-knowledge as to which system controller 300 an I/O device 500 may exist under the control of.

Therefore the present embodiment is configured such that the I/O reference control unit 150 first inquires as to the whereabouts of the target I/O device 500 (i.e., the system bus 200 (i.e., system controller 300) where the I/O device 500 exists) from a representative system controller 300 (i.e., SC0 in this case) and then issues an actual I/O request to the system bus 200 (i.e., system controller 300) returned in the response from the SC0 and thereby the I/O access to the target I/O device 500 is carried out.

Figure 6:
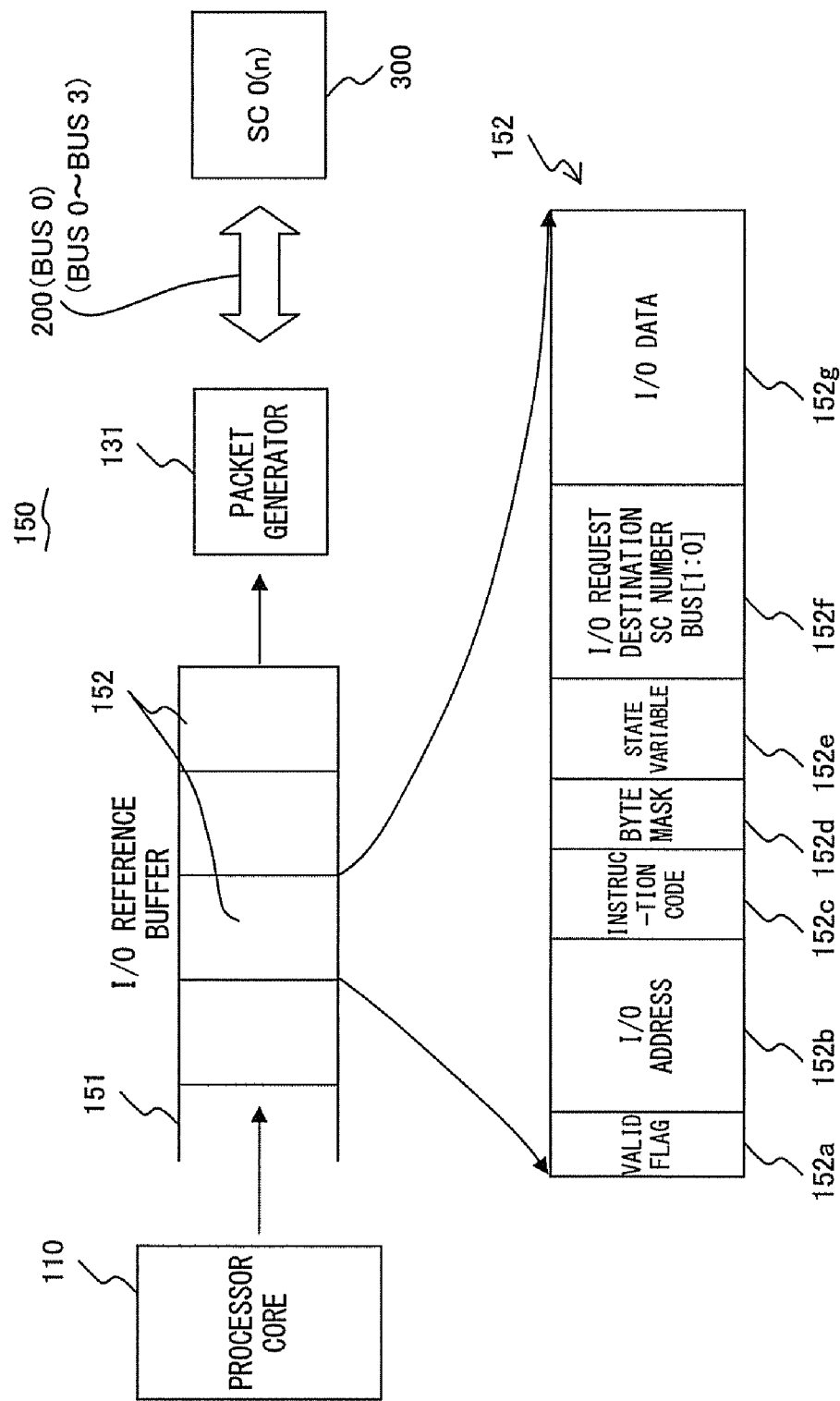
FIG. 6 is a conceptual diagram exemplifying the operation of an I/O access in a central processing apparatus according to a preferred embodiment of the present invention.

That is, the I/O reference control unit 150 according to the present embodiment is equipped with an I/O request queue 151 as exemplified in FIG. 6.

The I/O request queue 151 stores, starting from the processor core 110 side, I/O request frames 152 in order of occurrence of the I/O requests. An I/O request frame 152 is put together as a packet at the packet generator 131 and is sent to the system controller 300 by way of the system bus 200.

The I/O request frame 152 includes a valid flag 152a, an I/O address 152b, an instruction code 152c, a byte mask 152d, a state variable 152e, an I/O request destination SC number 152f, and I/O data 152g.

The valid flag 152a is information for controlling whether or not an I/O request frame 152 written in the I/O request queue 151 is to be enabled for execution.

The I/O address 152b is the address of a target I/O device 500.

The instruction code 152c sets an instruction to the I/O device 500.

The byte mask 152d is information indicating which of the 24 bits (3 bytes) of SCREQ_BUSn the I/O data 152g is to be assigned to.

The state variable 152e is information for managing the progress of I/O accesses executed in two separate events, as described above.

The SC numbers (0 through 3) indicating the whereabouts of I/O device 500 that was returned in the response in response to the initial inquiry to the SC0 is set in the I/O request destination SC number 152f.

FIG. 7 is a conceptual diagram exemplifying an I/O access transaction 600 executed by the I/O reference control unit 150.

The I/O access transaction 600 according to the present embodiment is constituted by the first SC request 601 and first response SC order 602, and by the second SC request 603 and second response SC order 604.

The first SC request 601 indicates an inquiry from the CPU node 100 to a specific SC0 regarding the whereabouts of an I/O device 500.

In the case of the present embodiment, four kinds of transaction names 600a are defined as:
NC-RD; non-cache read
NC-BR; non-cache block read
NC-WR; non-cache write
NC-BW; non-cache block write
for the first SC request 601, with the issuance origin 600b being the CPU (i.e., the CPU node 100) and the issued destination 600c being a specific SC0 (i.e., a system controller 300) for all of them.

The NC-RD is a request to the target I/O device 500 for reading I/O data 152g in units of bytes (e.g., 1 through 16 bytes).

The NC-BD is a request to the target I/O device 500 for reading I/O data 152g in units of blocks (e.g., 64 bytes).

The NC-WR is a request to the target I/O device 500 for writing I/O data 152g in units of bytes (e.g., 1 through 16 bytes).

The NC-BW is a request to the target I/O device 500 for writing I/O data 152g in units of blocks (e.g., 64 bytes).

The first response SC order 602 is the response from the SC0 to the first SC request 601. An I/O request destination SC number 152f is returned in this event.

In the first response SC order 602, there are two, that is:
SN-RES-NC; Snoop result of non-cacheable access
SN-RES-AX; Snoop result (address exception)
as the transaction names 600a.

The issuance origin 600b is the SC0 and the issued destination 600c is the CPU (i.e., the CPU node 100).

The SN-RES-NC responds with the number of the system controller 300 in which the inquired I/O device 500 exists.

The SN-RES-AX is returned as a response if there is no I/O device 500 applicable to the designated address per the inquiry.

The second SC request 603 is an execution of an I/O request to a target I/O device 500 existing under the control of a discretionary system controller 300 (SCn) identified by the I/O request destination SC number 152f.

In the second SC request 603, there are four, that is:
SR-NC; Slave read non-cache
SR-NB; Slave read non-cache block
SW-NC; Slave write non-cache
SW-NB; Slave write non-cache block
as the transaction names 600a.

The SR-NC is a request to the I/O device 500 for reading in units of bytes.

The SR-NB is a request to the I/O device 500 for reading in units blocks.

The SW-NC is a request to the I/O device 500 for writing in units of bytes.

The SW-NB is a request to the I/O device 500 for writing in units blocks.

For each of the above, the issuance origin is the CPU node 100.

Meanwhile, the issued destination 600c is the SC number (SC-WAY) returned as a response from the SC0 by means of the first response SC order 602. That is, the fact that "BUS [1:0] designated" is defined in the issued destination 600c indicates that an I/O request must be issued to the SC-WAY designated by the SN-RES-NC.

The second response SC order 604 is the response from the I/O device 500 (SCn) corresponding to the actual I/O request.

In the second response SC order 604, there are three, that is:
DOW=SR-NC-RTN
DOW=SR-NB-RTN
DOW=CMD-CPLT
as the transaction names 600a.

The DOW=SR-NC-RTN is the response to the SR-NC (non-cacheable read) with which the byte data read from the I/O device 500 is returned.

The DOW=SR-NB-RTN is the response to the SR-NB (non-cacheable block read) with which the block data read from the I/O device 500 is returned.

The DOW=CMD-CPLT is the response to the SW-NC and SW-NB (write and block write). The response to the write type is for responding as to whether or not a data write to the I/O device 500 is completed and is existent for controlling the releasing of a write-type I/O request.

Note that the issuance origin 600b in the second response SC order 604 is the same as the issued destination of the above described second SC request 603. The fact that "the same as SR-NC" is defined indicates that the second response SC order 604 (DOW) returns from the same place as the SCn that has issued the SR-NC.

FIG. 8 is a state transition diagram exemplifying state transitions when executing the above described I/O transaction 600 at the I/O reference control unit 150.

The following description is provided by exemplifying the case of executing an NC-RD as one example of the I/O transaction 600.

When an I/O request frame 152 is written to the I/O request queue 151, it is in the initial state 150a.

Then, when the execution of an I/O processing is enabled by the present I/O request queue 151, the valid flag 152a is enabled and thereby the state is shifted to the first execution state 150b.

Then, the first SC request 601 (NC-RD) is issued to the SC0 (i.e., the first SC request 601), and the state is shifted to the first response wait state 150c, waiting for a response (SN-RES-NC or SN-RES-AX) from the SC0.

Having received the SN-RES-NC or SN-RES-AX from the SC0 (i.e., the first response SC order 602), the I/O reference control unit 150 shifts the state to the second execution state 150d.

If the SN-RES-NC is received, the I/O reference control unit 150 issues an SR-NC (i.e., the second SC request 603) to a system bus 200 corresponding to the designated SCn and shifts the state to the second response wait state 150e.

Then, the I/O reference control unit 150 receives response information (i.e., the second response SC order 604) from the target I/O device 500 by way of the SCn and returns the state to the initial state 150a.

Meanwhile, receiving the SN-RES-AX in the second execution state 150d, the I/O reference control unit 150 carries out a prescribed error process, because the target I/O device 500 designated by the I/O address 152b does not exist, and returns to the initial state 150a.

The processes for the other transaction names, i.e., NC-BR, NC-WR and NC-BW, are similar.

Figure 9:
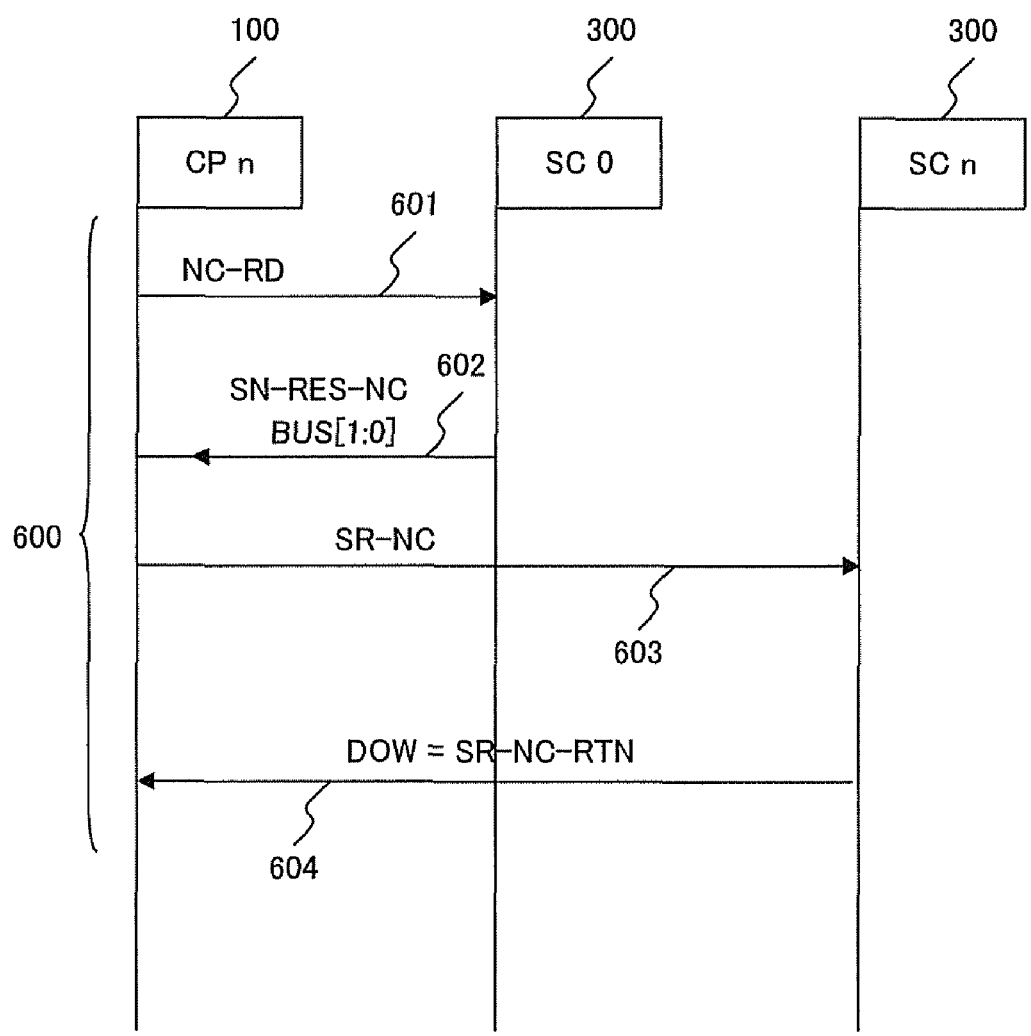
FIG. 9 is a sequence diagram exemplifying an I/O access transaction between a system controller and a central processing apparatus according to a preferred embodiment of the present invention.

FIG. 9 is a sequence diagram exemplifying the execution of a transaction related to an NC-RD as one example of an I/O access transaction 600.

In the I/O access transaction 600, the CPU node 100 issues an NC-RD to a specific SC0 (i.e., a system bus 200: SCREQ_BUS0) and inquires into an SC number where the I/O device 500 of a target I/O address (which is the first SC request 601).

Then, by way of SCODR_BUS0, the SC0 responds to the CPU node 100, which is the issuance origin, with the SC number of the system controller 300 having the target I/O device 500 under the control thereof by means of the SN-RES-NC (which is the first response SC order 602).

Having received the response, the CPU node 100 issues an I/O request for the I/O device 500, via SR-NC, to the system controller 300 (i.e., the system bus 200) of the SC number received by means of the first response SC order 602 (which is second SC request 603).

Then, having received the second SC request 603 (SR-NC), the I/O device 500 responds to the CPU node 100, which is the request origin, with the requested data by means of DOW=SR-NC-RTN.

As described above, the present embodiment is configured such that the memory reference control unit 140 comprised by the CPU node 100 distributes, to a plurality of the memory media 400 (i.e., the system controllers 300) in accordance with physical addresses, the memory references into the memory media 400 and thereby an interleave is carried out in units of, for example, 256 bytes.

This configuration makes it possible to reduce the number of signal lines of the buses between the CPU node 100 and system controller 300 in comparison with the case of carrying out a centralized interleaving at a single system controller 300.

That is, the configuration makes it possible to exert the processing capability of the CPU node 100 sufficiently by speeding up the accesses thereof to the memory media 400 without increasing the production costs of the system controller 300 and the information processing system comprising the present system controller 300.

Further, in an I/O reference access carried out from the CPU node 100 to the I/O device 500, an inquiry to a representative system controller 300 (i.e. an SC0) makes it possible to execute an I/O request by way of certain steps, that is, the process of knowing the position of the target I/O device 500 and the process of executing an actual I/O request to the obtained I/O device 500 (i.e., the system controller 300, i.e., the system bus 200).

This configuration makes it possible to achieve an appropriate I/O access to a plurality of I/O devices 500 in which the I/O addresses are mapped in the memory address space even when executing a memory interleave at the CPU node 100.

That is, the configuration makes it possible to achieve, in the individual CPU nodes 100, an appropriate I/O access to a plurality of I/O devices 500 in which the I/O addresses are mapped in the memory address space without requiring a storage resource for storing the affiliation information of a plurality of I/O devices 500 against a system controller(s) 300, or similar information, and without requiring a complicated control such as managing the aforementioned affiliation information.

Figure 10:
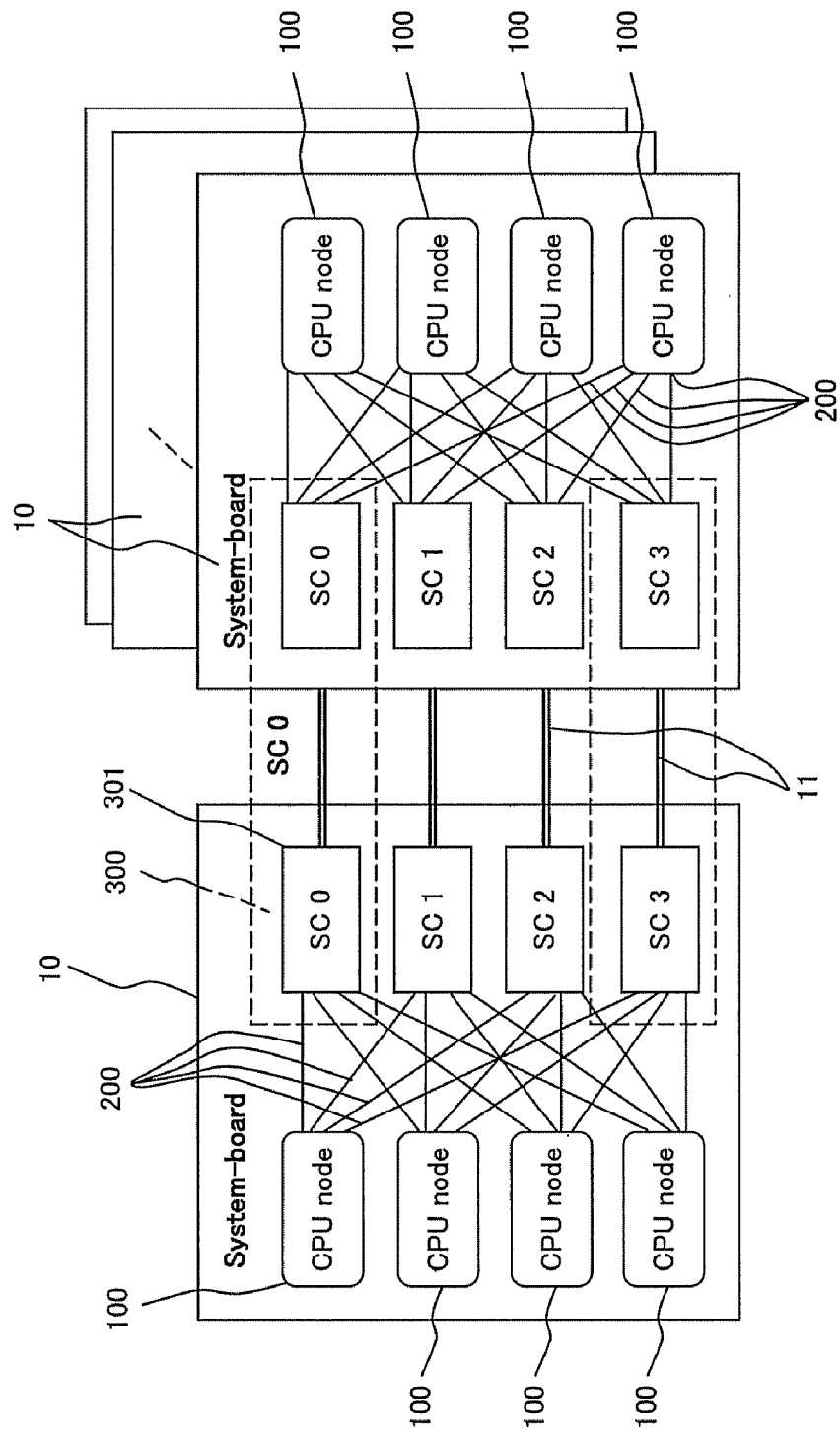
FIG. 10 is a conceptual diagram exemplifying the implementation of an information processing system comprising a central processing apparatus according to a preferred embodiment of the present invention.

Note that FIG. 10 shows an example implementation of the CPU nodes 100 and system controllers 300 that are exemplified in FIG. 1.

In the configuration exemplified in FIG. 10, the CPU nodes 100 and system controllers 300, which constitute the information processing system, comprise one or more system boards 10.

The system controller 300 behaves as a single logical system controller 300 (SCn) as a result of connecting a plurality of semiconductor chips 301 by way of a crossbar switch 11 or the like.

For example, the SC0 enclosed by the dotted line box in FIG. 10 is equivalent to the SC0 (i.e., the system controller 300) exemplified in FIG. 1.

APPLICABILITY TO INDUSTRY

The present invention makes it possible to attain a high memory bandwidth and to utilize the processing capability of a central processing apparatus effectively without complicating the configuration of system controllers connected to the central processing apparatus.

The present invention makes it possible to achieve an improvement in the processing capability of a central processing apparatus executing a memory interleave at a low cost without complicating the configuration or management of the central processing apparatus.

Note that it is obvious that the present invention can be changed in various ways possible within the scope thereof, in lieu of being limited to the configuration exemplified in the above described embodiment. For example, the configurations of the central processing apparatus and information processing system are not limited to the examples put forth in the above described embodiments.

What is claimed is:

1. A information processing apparatus, comprising:
a plurality of devices each of which stores data, accessed by using an address and replies the data when accessed;
a plurality of system controllers that each connects to each of the plurality of devices, each includes configuration management table including a plurality of pairs of an address information and a bus information, each replies a bus information corresponding to an address included in an first access request by using the configuration management table, and each transfers the data from a device specified by the address included in a second access request; and
a processor that connects to the plurality of system controllers via each of a plurality of buses, issues the first access request to one of the plurality of the system controllers, issues the second access request to a system controller via a bus specified by the bus information included in a reply of the first request from the one of the plurality to the system controllers, and receives the data transferred via the specified system controller from a device specified by the address included in the second access request.

2. The information processing apparatus according to claim 1, wherein the address information included in the configuration management table corresponds to a portion of an address included in the first access request.

3. The information processing apparatus according to claim 1, wherein the plurality of system controllers are identified by system controller identification numbers each of which is corresponding to a bus information.

4. The information processing apparatus according to claim 1, wherein the device is a memory device.

5. The information processing apparatus according to claim 1, wherein the device is a memory mapped I/O device.

6. A control method for an information processing apparatus including a processor connecting to a plurality of the system controllers, each connecting to one of a plurality of devices each of which stores data accessed by using an address and replies the data when accessed, the control method comprising:

issuing a first access request to one of the plurality of the system controllers by the processor;

replying bus information corresponding to an address included in the first access request by using a configuration management table including a plurality of pairs of address information and bus information by the one of the system controllers;

issuing a second access request to a specified system controller via a bus specified by the bus information included in a reply of the first request from the one of the system controllers; and receiving the data transferred via the specified system controller from a device specified by the address included in the second access request, wherein the plurality of the system controllers are identified by system controller identification numbers each of which is corresponding to bus information.

7. The control method according to claim 6, wherein the address information included in the configuration management table corresponds to a portion of an address included in the first access request.

8. The control method according to claim 6, wherein the device is a memory device.

9. The control method according to claim 6, wherein the device is a memory mapped I/O device.

* * * * *